United States Patent [19]

Estkowski

[11] 3,759,531

[45] Sept. 18, 1973

[54] RECORD CHANGER SPINDLE

[75] Inventor: Michael H. Estkowski, St. Joseph, Mich.

[73] Assignee: V-M Corporation, Benton Harbor, Mich.

[22] Filed: July 23, 1971

[21] Appl. No.: 165,681

[52] U.S. Cl. .......... 274/10 S

[51] Int. Cl. .......... G11b 17/04

[58] Field of Search .......... 274/10 S

[56] References Cited

UNITED STATES PATENTS 3,064,981 11/1962 Churchill .......... 274/10 S

*Primary Examiner*—Louis R. Prince
*Assistant Examiner*—Charles E. Phillips
*Attorney*—John A. Dienner et al.

[57] ABSTRACT

Record changer spindles designed for feeding phonograph records of a thickness heretofore regarded as standard do not always operate satisfactorily on records of other than standard thickness such as are now coming on the market. The record changer spindle of the present invention is capable of automatically feeding onto the turntable successive phonograph records, one at a time, from a stack which may include interspersed records of different thicknesses or a stack of records all of the same thickness, either thick or thin.

10 Claims, 8 Drawing Figures

Inventor:-
Michael H. Estkowski,
By Johnson Dienner Emrich Verbeck & Wagner. Attys

RECORD CHANGER SPINDLE

BACKGROUND OF THE INVENTION

Record changer spindles of the prior art are adapted to feed records of a standard thickness at the center hole. This thickness in the region of the center hole of 10 and 12 inch 33 ⅓ RPM records varies with different manufacturers and different times, but is generally in the neighborhood of 0.065 to 0.085 inches, although this may vary with the company of origin and with the time when the standard was adopted.

The manufacturers of record changer spindles have generally adjusted them to pass a thickness of 85 mils. However, those changers that play 78 RPM records have their spindles adjusted to also pass thicknesses up to 0.100 inch, which latter is the standard upper limit of a 78 RPM record. Moreover, tolerances encountered in manufacturing produce spindles whose "pass" dimensions vary about the theoretical value. The thin lightweight records now coming on the market have a thickness of the order of 54 mils. Consequently, the record changer spindles adapted to the thicker records encounter difficulty in feeding only one record at a time when records of a lesser thickness are placed on spindles designed for feeding the thicker records. The spindle will tend to release two records instead of releasing only the bottom one of the stack. The result has been that the user would find it highly advantageous to have a record changer spindle which would satisfactorily feed records automatically one at a time from a stack of thick records or from a stack of thin records or from a stack of interspersed thick and thin records.

SUMMARY OF THE INVENTION

The record changing spindle of the present invention is organized and constructed to feed one at a time and with equal facility either thick or thin records from a stack of all one thickness, either thick or thin, or from a stack of interspersed records of different thicknesses.

DESCRIPTION OF THE DRAWINGS

In a single sheet of drawings

DESCRIPTION OF THE PREFERRED EMBODIMENT

Figures 1, 2, 3, 4, 5, 6, 7, 8:
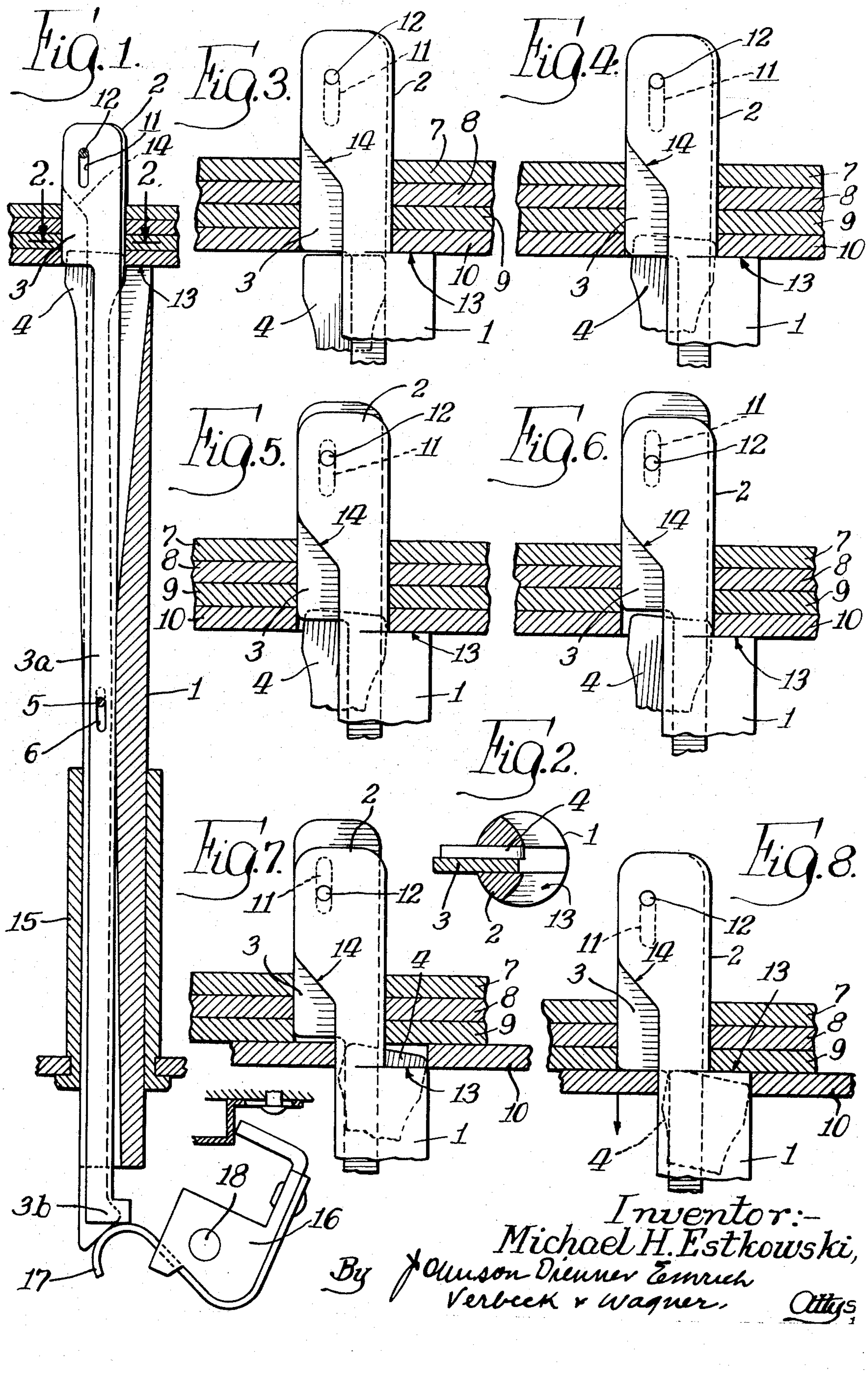
FIG. 1 is a vertical longitudinal view of the record changer spindle of my present invention.
FIG. 2 is a cross sectional view taken on the line 2—2 of FIG. 1.
FIGS. 3 to 8 inclusive are vertical axial sections through the upper end of the spindle of my invention showing a stack of records held on a shoulder of the spindle with a gate member for controlling the release of the lowermost record and a pusher for pushing the lowermost record off the spindle to allow it to descend onto the turntable.

FIG. 1 of the drawing shows the body of the spindle to consist of a main guiding and supporting portion 1 and an offset record holding portion 2 structurally integral with the main portion 1. The record holding portion 2 and the main guiding portion 1 are slotted lengthwise for their full length to accommodate in side-by-side relation the gate member 3 and the pusher member 4 which have depending lever portions pivoted on a pin 5 mounted in the main guiding portion of the spindle 1 and each having a vertical longitudinal slot 6 to permit up and down motion longitudinally of the said main guiding portion 1. The pusher 4 has a widened upper end of substantially the width of the diameter of the opening in the records. The entire gate member 3 is guided for vertical motion only, both by pin 5 in the body of the main guiding portion of the spindle and slot 6 in the lower end of the gate member, and also by pin 12 in the record holding portion of the spindle and slot 11 in the upper portion of gate member 3. In other words the cam mechanism which actuates the gate imparts only a guided vertical motion to it. The gate member 3 at its upper end is of a width substantially equal to the diameter of the openings in the records, its sole function being to act as a bar against movement of the records to the right as viewed in the drawing, which motion to the right is essential to registering the hole in the record in each case with the end of the rod which is offset at 13 to provide the stack supporting shoulder.

The upper record holding portion 2 of the spindle is generally cylindrical in shape except for the lower portion which is elliptical in cross section and conforms to the diameter of the hole in the records (see FIG. 2) and also to the diameter of the guiding portion of the spindle. Adjacent the junction of the upper part of the record holding portion 2 with the main guiding portion 1 of the spindle, the said record holding portion 2 is cut away as indicated on the dotted diagonal line 14 (see FIG. 1) to provide clearance for movement of the records towards the right, in the drawing, to allow a record to be pushed off of the shoulder 13. The connecting section between the upper cylindrical portion of portion 2 and the lower cylindrical portion of portion 1 is indicated in cross section in FIG. 2. That is to say the records, while they are held on the shoulder 13, have their central openings embracing the extension 2 and the lowermost record, such as 10, is moved to the right in the drawing to get the record where its central hole will register with the cylindrical main guiding portion 1 of the spindle.

The pusher 4 in its lowermost position as shown in FIG. 3 lies just below the shoulder 13 and below the level of the bottom surface of the lowermost record 10. It will be observed from FIG. 1 that the slot in the main guiding portion 1 of the spindle provides clearance for a swinging motion to the right in FIG. 1 of the said pusher member.

The main guiding portion of the spindle 1 is supported in a frame which provides the tubular support 15 in which said spindle is mounted and it will be understood that a suitable turntable with automatic means for initiating a record change upon the completion of the playing of a previous record is contemplated. This is not described since it is well understood by those skilled in the art. When, in the course of an automatic record playing, the tone arm has been raised from the played record and moved to the side it is in order for the automatic mechanism to actuate the above described mechanism to release the lowermost record in the stack whereby to drop it onto the turntable. After moving the tone arm to the side of the turntable it operates through the mechanism shown at the bottom of FIG. 1 to begin to raise the gate member 3 from the position shown in FIGS. 1 and 3, and simultaneously to thrust the pusher 4 upwardly above the level of the shoulder 13 and into the interior of the lowermost record. This is done by rocking the shaft 18 clockwise from its normal position shown in FIG. 1 to perform two functions—first, clockwise motion of the shaft 18 and the spring carrier 16 from its normal inactive position shown in FIG. 1 applies an upward thrust to the lower end 3*b* of the gate member 3 and secondly, a thrust upwardly and outwardly in a clockwise direction around the pin 5 for the pusher 4. That is to say, the pressure of the spring 17 and its movement in a clockwise direction thrusts the gate member upwardly and also raises the pusher and tends to swing its lower end to the left as shown in FIG. 1 in a clockwise direction which brings the upper end of the pusher 4, as shown in FIG. 4, into the interior of the hole in the lowermost record to put it under tension tending to push the lowermost record 10 off of the shoulder 13.

However, so long as the gate member 3 remains in the hole of the lowermost record 10, the pusher is unable to move the said record 10 and merely builds up a spring stress which may be all or partly in the pusher or in the spring 17, or both. Then upon further movement of the shaft 18 and the connected spring 17 the gate is slowly advanced upwardly until it has cleared the lowermost record 10 as shown in FIG. 6.

At that stage the gate 3 still occupies the hole in the next to the lowermost record which is number 9, as may be seen in FIG. 6, but the stored energy in the pusher 4 and the spring 17, or either or both, is now released by the upper end of the pusher 4 exerting a force on the lowermost record to the right to slide the record 10 from the shoulder 13 as shown in FIG. 7. Thereupon the said lowermost record drops by gravity to the turntable. The remaining stack of records 7, 8 and 9 drops down with the initial drop of the lowermost record 10 but they are held in registration with the shoulder by the fact that only vertical forces remain when the stack drops onto the shoulder 13. This disposition of forces is made possible by the relative timing that exists between pusher shoving record off shoulder 13 and upward gate motion. Said relative motions are of such nature that the lowermost record is shoved off the shoulder 13 after the gate 3 clears the upper edge of the lowermost record. When the lowermost record center hole (under the action of the pusher) coincides with the cylindrical main guiding portion 1 of the spindle all the lateral motion has been completed and the lowermost record moves downward. The records lying above the lowermost record now respond to a vertical downwardly directed force as they follow the receding lowermost record. Being centered about the record holding portion of the spindle the downwardly moving records or record stop at the shoulder 13. Meanwhile, the cycling mechanism returns shaft 18 and connected parts to the position shown in FIG. 1. When the automatic cycling mechanism is again operated the above described cycle is repeated.

The specific embodiment which I have described above is the preferred form but the principles of the invention may find embodiment in a modification in which the gate arrangement is peripheral of the record instead of central. Likewise, the push-off or release is accomplished from the outer edge of the record instead of from the central hole, or both the release and the gate are accomplished at the periphery instead of at the central hole. The combination of the gate travelling towards the release position while the pusher is accumulating power to kick the lowermost record off the shoulder is highly advantageous in that the operation of the record changing is accomplished with a sharp powerful movement which, however, does not require the application of a sudden load on the operating motor.

I claim:

1. A record feeder for phonograph records and the like comprising in combination a vertical spindle member having an offset forming a vertically facing record supporting shoulder and an upwardly extending magazine portion above the shoulder, a gate member for holding the lowermost record of a stack of records against edgewise releasing movement off the shoulder, when said gate member is in a lower position, means for elevating the gate member to an upper position releasing the lowermost record; and means for applying resilient pressure to and edgewise of the lowermost record prior to the release of said lowermost record in order to shove it off the shoulder when the gate member releases said record for said edgewise movement.

2. The combination of claim 1 wherein the resilient pressure upon the lowermost record is progressively increased prior to release of the record by said gate member.

3. The combination of claim 1 wherein the gate member and the means for applying resilient pressure, edgewise of the record, engage opposite sides of the central hole in the record.

4. In combination for feeding phonograph records one at a time from a stack, upwardly facing record supporting means for supporting a stack of records above the turntable, record guiding means for guiding said records successively onto the turntable, gate means for holding the records of the stack against edgewise movement, means for elevating the gate means to clear the engaged edge of the lowermost record, pressure applying means for displacing said lowermost record from said supporting means when said gate means disengages the related edge of the lowermost record, said displacing means applying a progressively increasing resilient pressure to the edge of the lowermost record before the gate means releases said lowermost record.

5. In combination a spindle having a shoulder for holding one or more records to be dropped from the shoulder one at a time, a pusher for engaging the edge of the lowermost record and pushing it off the shoulder, means for putting the pusher under pressure tending to push the lowermost record off the shoulder, and gate mechanism adapted to prevent movement of the record off the shoulder until the gate mechanism has risen to the level of the upper edge of the record, cyclic means for progressively spring-loading the pusher in a direction to push the lowermost record off the shoulder and simultaneously advancing the gate mechanism in a direction to release the lowermost record and allowing the said lowermost record to be pushed off the shoulder whereby it descends along the spindle by gravity.

6. The combination of a record feeding spindle comprising a main body and a record holding portion offset from said main body to present an upwardly facing shoulder at the top of said main body, said spindle having a lengthwise extending slot, a gate member slidably supported in said slot for vertical movement between an upper and lower position, the lower end of said gate member when in said lower position holding the lowermost record against edgewise releasing movement off said shoulder and in said upper position releasing the lowermost record for edgewise movement, a pusher member slidably supported in said slot for both angular and vertical movement, resilient cam means for simultaneously raising said gate member and angularly swinging the lower end of said pusher member to cause its upper end to engage the edge of the lowermost record in a direction tending to push the lowermost record off said shoulder, whereupon the engagement of said upper end of said pusher member with said lowermost record causes said resilient cam means to progressively apply resilient pressure to said pusher member prior to release of said record by said gate member.

7. The combination of claim 6, further including a pin and slot connection between the main body of the spindle and the pusher.

8. The combination of claim 7 further including a pin and slot connection between the main body of the spindle and the gate member.

9. The combination of claim 8 wherein said resilient cam means includes a cam operated spring finger for actuating the pusher to enter the hole in the lowermost record and applying pressure thereto to move it off the shoulder before the gate member releases the lowermost record.

10. Means for feeding a record from a stack of records onto a turntable having a spindle with a vertical guiding portion at its center, supporting shoulder means under the lowermost record of the stack for holding the stack in elevated position with the central openings of the records in the stack out of register with the guiding portion of the spindle, means for applying a resilient pressure edgewise to only the lowermost record of the stack tending to push the lowermost record off the shoulder to release it in register with the guiding portion of the spindle for descent upon the turntable, and vertically movable gate means normally engageable with the edges of the lowermost and next lowermost records of the stack and preventing lateral releasing movement of said records, lateral releasing means for moving the gate means vertically after the resilient pressure applying means has begun to apply pressure to the edge of the lowermost record, movement of the lowermost record occurring under the pressure of said resilient pressure applying means when said gate means rises above the edge of the lowermost record on the stack.

* * * * *